United States Patent [19]
Panas

[11] 3,855,966
[45] Dec. 24, 1974

[54] UNIVERSAL CHUCKING MECHANISM

[75] Inventor: Walter Panas, Millville, N.J.

[73] Assignee: Wheaton Industries, Millville, N.J.

[22] Filed: Nov. 30, 1973

[21] Appl. No.: 420,365

[52] U.S. Cl. .................... 118/66, 118/69, 118/406, 118/421, 118/503, 118/504, 117/47 H, 117/119.6
[51] Int. Cl. .................... B05c 11/14
[58] Field of Search ....... 118/66, 69, 421, 423, 503, 118/406, DIG. 5, 504, 230, 319; 117/119.2, 119.6

[56] References Cited

UNITED STATES PATENTS

| | | | |
|---|---|---|---|
| 2,695,595 | 11/1954 | Hagerman | 118/503 |
| 2,838,023 | 6/1958 | Jaime | 118/66 |
| 3,253,943 | 5/1966 | Mayer | 118/423 |
| 3,270,710 | 9/1966 | Johnson | 118/66 |
| 3,440,078 | 4/1969 | Sharetts | 118/504 |
| 3,631,837 | 1/1972 | Carl | 118/504 |
| 3,734,765 | 5/1973 | Russell | 118/66 |

*Primary Examiner*—Mervin Stein
*Assistant Examiner*—Douglas A. Salser
*Attorney, Agent, or Firm*—Miller, Frailey & Prestia

[57] ABSTRACT

In a system for applying a plastic coating to arbitrarily shaped bottles or other containers which have been heated to a desired temperature in a preheat oven, the containers are loaded on a continuous horizontal conveyor which has a plurality of universal chuck mechanisms attached periodically along its length. Each such chuck includes a bottom member which is fixed relative to the conveyor, and an upper member which includes a centrally located plunger normally loaded upwardly. When containers are coupled to the conveyor for coating, they are mounted over the bottom portion of the chuck, and the positioning pin is forced downwardly, thereby maintaining the container in a state of compression. The containers are advanced over a fluidized bed of thermoplastic resins, and before the bed is raised up about the containers, a mask which is attached to the upwardly loaded outer cylinder of the chuck is lowered over specified portions of the containers. When the bed is lowered once more, the mask is raised and the containers are passed into a postheating oven. Next, the containers are cooled at ambient temperature and subsequently by air at a still colder temperature. Finally, the containers are removed from the chucks, and the process is repeated.

18 Claims, 16 Drawing Figures

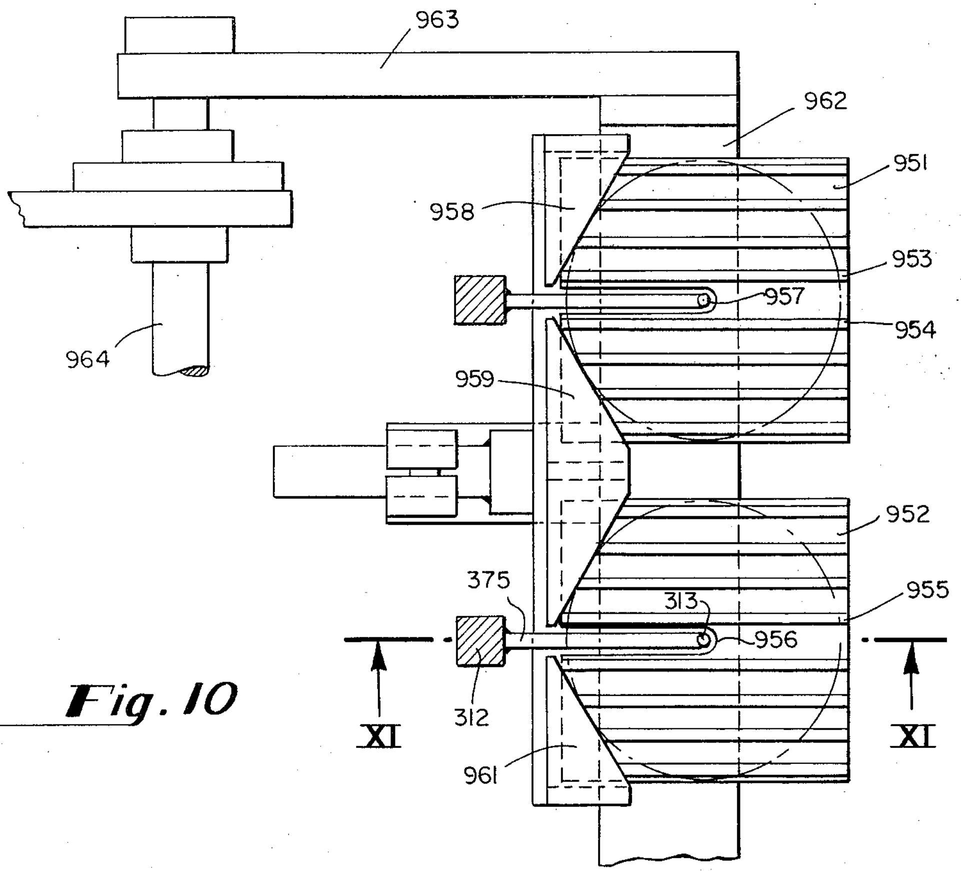
Fig. 10
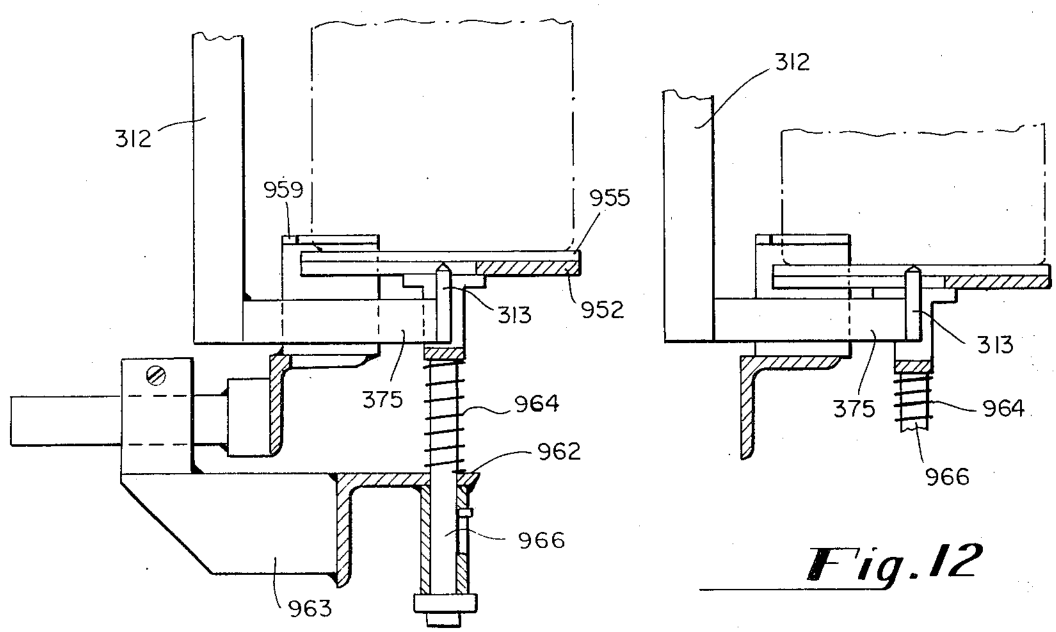
Fig. 11
Fig. 12

1308
1306
1307
1309
104
102
101
1302
431
2207
31
102
101
312
1427
104
314
1305
316
313
1305

XIV
1306
1308
104
101
1301
102
1302
431
431
101
102
1428
1427
316
XIV
1305
1311

| FUNCTION | 1 | 2 | 3 | 4 | 5 | 6 | 7 | 8 | 9 | 10 | 11 | 12 |
|---|---|---|---|---|---|---|---|---|---|---|---|---|
| INDEX CONVEYOR | | 4 SEC | | | | | | | | | | |
| MASKS DOWN | | | | | .75 | | | | | | | |
| POST HEAT DOOR CLOSED | | | | | .75 | | | | | | | |
| FLUID BED RAISES | | | | | | 1.75 | | | | | | |
| DWELL FLUID BED | | | | | | | | 1.50 | | | | |
| LOWER FLUID BED | | | | | | | | | 1.75 | | | |
| BOTTLE BLOWOFF | | | | | | | | | 1.50 | | | |
| MASK UP | | | | | | | | | | | .75 | |
| POST HEAT DOOR OPEN | | | | | | | | | | | 1.50 | |
| CHUCK PILOT PIN-UP | | | | | .75 | | | | | | | |
| BOTTLE GRIPPER FINGERS CLOSE | | | | | 2 SEC | | | | | | | |
| BOTTLE TRANSFER - FORWARD | | | | | | | 2 SEC | | | | | |
| BOTTLE GRIPPER FINGERS OPEN | | | | | | | | | .75 | | | |
| BOTTLE TRANSFER - RETRACTS | | | | | | | | | | 2 SEC | | |
| CHUCK PILOT PIN-DOWN | | | | | | | | | | .75 | | |
| BOTTLE TABLE - UP | | | | | | | $8\frac{1}{3}$ SEC | | | | | |
| BOTTLE TABLE - DOWN | $3\frac{1}{3}$ SEC | | | | | | | | | | | $\frac{1}{3}$ |
| CHUCK BLOWOFF | | | | | | 4 SEC | | | | | | |
| INFEED BOTTLE LOADER-FORWARD | | | | | 2 SEC | | | | | | | |
| INFEED BOTTLE LOADER-RETRACT | | | | | | | 2 SEC | | | | | |

*Fig. 15*

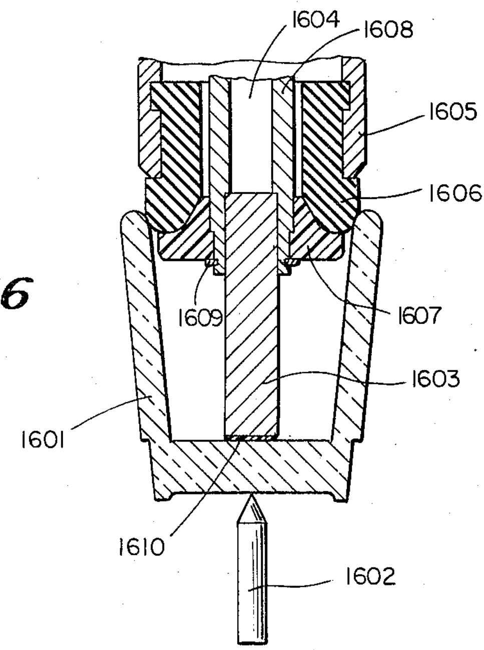

*Fig. 16*

UNIVERSAL CHUCKING MECHANISM

BACKGROUND OF THE INVENTION

This invention relates to apparatus for applying a thermoplastic coating to glass bottles and other such containers, and more particularly to such apparatus which utilizes a universal chuck mechanism which may be readily adapted to process containers of widely varying shapes and sizes.

In recent years, there has been increasing interest in the application of plastic coatings to glass bottles and the like, either to effect a change in the surface appearance or feel of the containers, or to limit their tendency to shatter upon breaking. The latter objective has become more and more prominent with the increasing emphasis on product safety.

Until recently, the processes by which it has been proposed to apply plastic coatings to glass bottles have generally involved use of spraying, and particularly electrostatic spraying, or of immersion in a liquid coating material. Such processes for applying plastic coatings to glass bottles have not been generally acceptable either because of the high cost involved or because of the inferior quality of the attainable coatings in high volume applications.

In a separate patent application of Fred E. Allen, entitled, *In Line Process for Plastic Coating Glass Bottles*, to be filed in the near future and assigned to the assignee of the present invention, there is described a process and apparatus for applying plastic coatings to glass bottles by a fluid bed process in the course of their manufacturing operation. That application is more specifically directed to containers of a specified type, however, and is not readily amenable to low volume applications where numerous types of bottles and containers of various shapes and sizes will be coated.

The basic technology of fluid bed coating is well known. It involves immersing a heated article in a bed of powder which is fluidized, or kept in a state of constant suspension by the impingement of up-flowing gasses from the bottom of the bed. The powder consists of thermoplastic resins in finally divided particulate form, and is commercially available as a product specifically designed and identified for use in a fluid bed coating. The article to be coated is heated prior to immersion such that its surface temperature exceeds the melting point of the coating resins. Thus, when the article is immersed, its surface heat causes melting of the thermoplastic resin particles in contact therewith and the deposition thereon of the coating of the thermoplastic material.

It is a primary object of the present invention to provide a process and apparatus for conveniently coating containers of varying shapes and sizes by a fluid bed process.

It is more particular object of the present invention to provide a universal chuck mechanism which is useful in connection with a large variety of containers.

It is a still further particular object of the present invention to provide a universal chuck mechanism for use in a fluidized bed coating process which is readily adaptable for processing containers whose specifications vary widely, as in multiple limited production situations.

SUMMARY OF THE INVENTION

These and other objects are met by apparatus wherein a continuous recirculating conveyor system has mounted thereon periodic groups of universal chuck mechanisms. In particular, the chuck mechanisms are fixed to the continuous conveyor and consist of a lower fixed bar with a sharp point located at the chuck centerline and an upper spring loaded section that maintains the clamp on the article to be coated between the upper section and the sharp point. One part of the upper portion maintains the containers in fixed position relative to the lower pointed portion, and another provides a masking capability for select portions of the container. Once the containers are secured on the chucks, they may be processed by immersion in the fluidized bed, and subsequently heated and cooled to achieve the desired plastic coating finish.

In an illustrative embodiment, bottles are coupled a pair at a time onto guide tables which pivot upwardly from the conveyor main frame. So positioned, bottles are conditioned to be secured between the lower portion of a chuck, which is in the area of the positioning tables, and the upper portion, which temporarily has been drawn upwardly away from the bottle. The upper portion of each chuck involves a positioning pin normally loaded downward which secures the bottle in compression with the fixed lower portion of the chuck. The chuck mechanisms each include a mask portion, which is normally loaded upward and which may be forced downwardly over select portions of the container. Thus, once the positioning pin secures the bottles on the chuck, the positioning table swings away and the bottles are brought above a fluidized bed tank. As the tank is raised over the bottles, the shields are dropped over a desired portion of the bottles, remaining in such position until the bed is lowered. Thereupon, the shields are raised, and the bottles are passed into a post heating oven, after which they are cooled until they may be removed from the chucks.

BRIEF DESCRIPTION OF THE DRAWINGS

FIGS. 10 through 12 show a positioning mechanism whereby containers from the FIG. 7 loading apparatus are positioned relative to the universal chuck shown in FIGS. 3 and 4;

FIG. 15 sets forth an exemplary timing scheme for the apparatus of FIGS. 1 through 14; and FIG. 16 suggests an adaptation of the principles of the present invention for containers other than bottles.

DETAILED DESCRIPTION OF THE INVENTION

Figure 1:
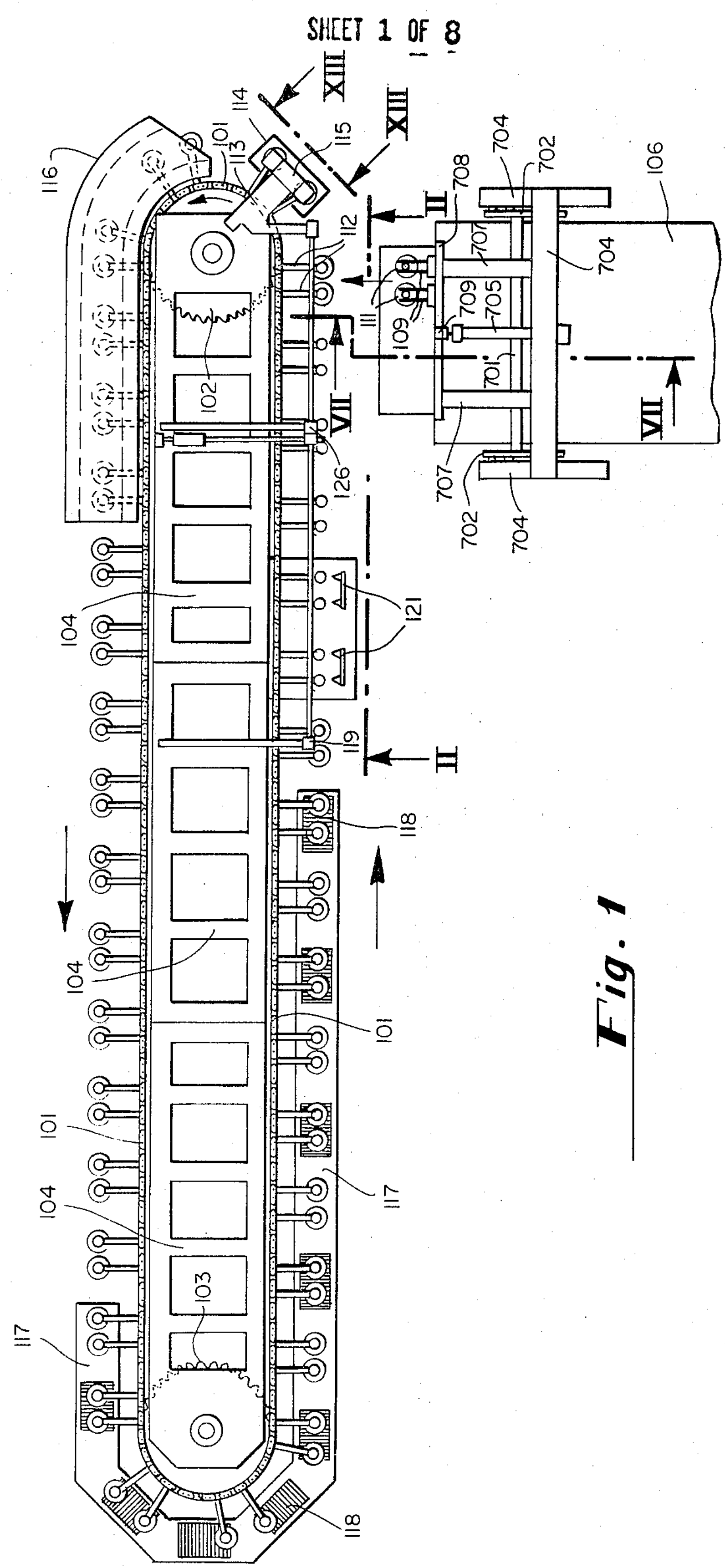
FIG. 1 shows a top view of an entire conveyor processing system which embodies the principles of the present invention.

The embodiments of the present invention which are described herein are designed to process containers in pairs. However, it should be emphasized that the principles of the present invention are by no means limited thereto, and in alternative embodiments such as are suggested herein, six or more containers may be processed as a group. In fact, the embodiment of FIG. 1 is constructed such that six containers at a time may be processed with only minor changes required. Moreover, extension to any number of containers at a time is feasible merely by similar enlargements of dimension.

In FIG. 1, there is shown a continuous horizontal conveyor generally designated 101, which is driven in a counterclockwise fashion by a powered sprocket wheel assembly 102 which is situated opposite a supportive sprocket 103. The conveyor 101 and the sprockets 102 and 103 are mounted on a frame support generally designated 104.

The embodiment shown in FIG. 1 relates to the processing, preparation, and conveying of containers such as glass bottles for coating with materials such as thermoplastic resin powders by means of a fluidized bed coating process. As is described in detail in the abovementioned application of F. E. Allen, that process basically involves preheating of the glass bottles and immersing them in a tank which contains an air suspension of thermoplastic resin powder, which adheres to the heated bottles. In the FIG. 1 embodiment, the coated bottles are subjected to further heat after coating, and the resin powder plasticizes and is allowed to set, whereupon a cooling procedure is performed. Finally, the coated bottles are removed and packaged.

In FIG. 1, the bottles are passed by means of a conveyor belt, not shown, from a glass tempering lehr 106 while they are still in a heated state. As shown in FIGS. 1 through 14, two bottles at a time are taken from the lehr 106, immersed in the fluidized bed, and the like. However, the lehr 106 and the belt, not shown, are sufficiently wide to process six bottles at a time. A pair of loading arms 109 are situated relative to the lehr 106 such that they apprehend bottles such as 111 for delivery to the conveyor mechanism 101.

In a manner which is described in detail hereinafter, the arms 109 convey the bottles such as 111 to the conveyor 101 where they are each secured in a desired orientation on universal chuck mechanisms such as 112. Periodically, the conveyor 101 is energized to advance for a predetermined distance. It is during the stopping periods which alternately occur that the bottles are loaded from lehr 106 onto the chucks such as 112, and also that the coating occurs in the fluidized bed tank. More particularly, situated at point 113 of the conveyor 101 is a tank 114 which contains a fluidized bed of thermoplastic resin powder. Whenever a pair of chucks bearing bottles is stopped at point 113 on the conveyor 112, the heated bottles are immersed in the fluidized bed causing the powder to adhere thereto. During the next succession of movements, the bottles which have the powder adhering are conveyed to a heating oven 116 which contemplates plastification of the resin powder, causing an even coating of plastic to be deposited on the bottles. Next, the plastic coated bottles pass along a segment which is at ambient temperature, where they begin cooling. After the ambient temperature of the air has caused sufficient cooling of the bottles that they will not break when subjected to colder air, the plastic coated bottles are passed on to a cooling segment 117 which includes vents 118 for passing cold air over the bottles. This cooling process finally sets the plastic coating and cools the bottles to a temperature at which they may be handled. At a control station 119, the universal chucks which held the bottles in securement since they were coupled to the conveyor 101 from the lehr 106 are released, allowing the bottles to be removed, either automatically or by hand. Thereupon, in preparation for subsequent reloading of the bottles from the lehr 106, air jets 121 are forced onto the chucks, thereby removing any plastics which had remained thereon.

The process performed by the apparatus of FIG. 1 may therefore be summarized in terms of the steps of preheating the bottles, mounting them on chucks, immersing them in a fluidized bed of thermoplastic resin powder, post-heating of the bottles to plasticize the resins and thereby plastic coat the bottles, cooling of the coated bottles first at ambient temperature and then by colder air, removal of the bottles from the chucks, and air cleaning of the chucks in preparation for subsequent repetitions of the same process. While this process has been described for bottles, and the remainder of the disclosure shall likewise be so framed, it is to be understood that any sort of container may be utilized, including narrow mouth and open mouth bottles, glasses, and other such containers.

Figure 2:
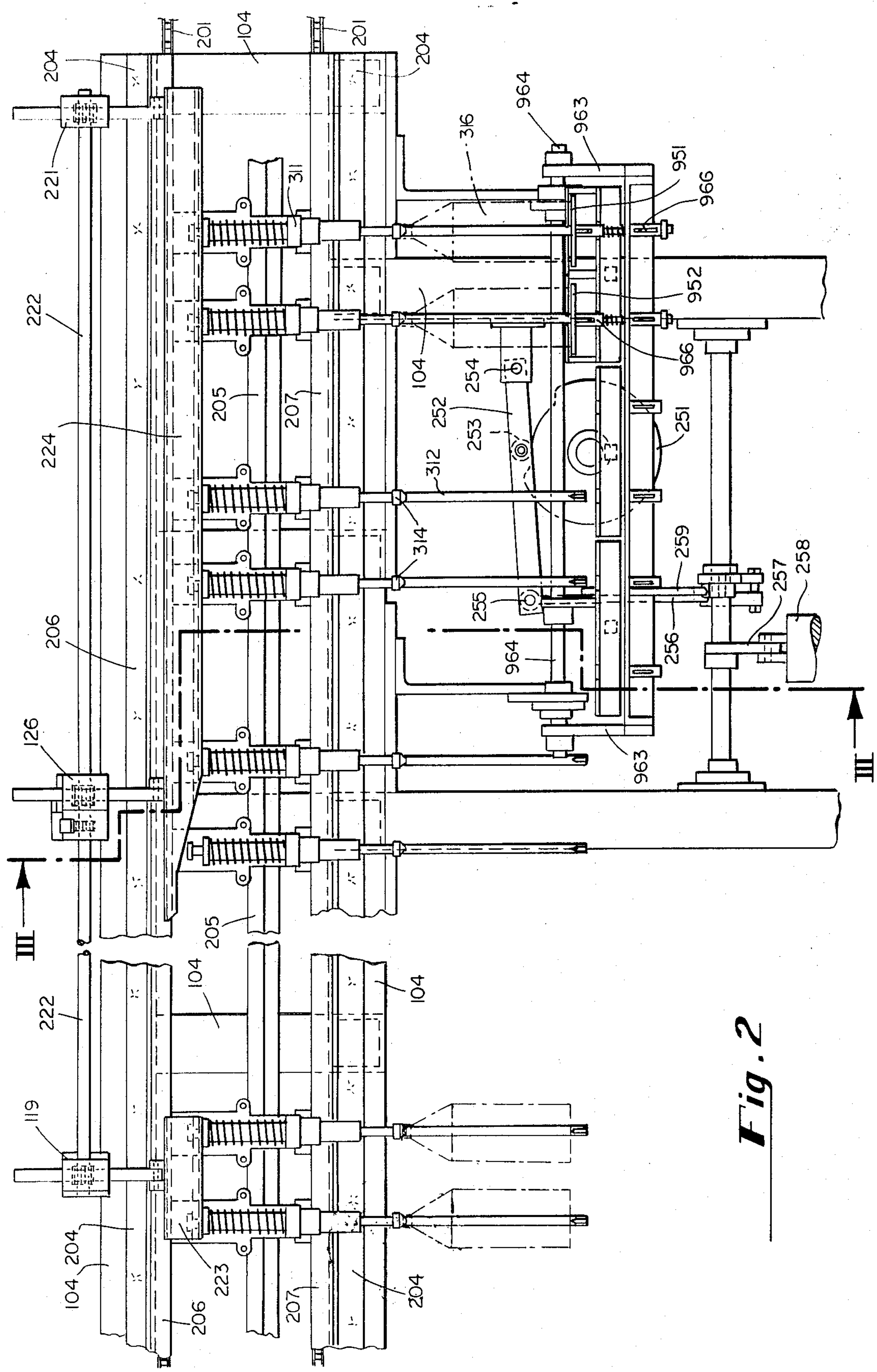
FIG. 2 shows a sectional view of the FIG. 1 apparatus which illustrates part of the container loading and unloading phases of the operation.

FIG. 2 shows a lateral view of the portion of the conveyor mechanism 101 which includes the unloading and loading areas thereof. In FIG. 2, the chuck assemblies are located in pairs at regular distances along the conveyor assembly. Grouping these chuck mechanisms in twos allows for processing of bottles two at a time in the fluidized bed. Of course, if it is desired to process more than two at a time, such as for example, six at a time, the close grouping of chuck mechanisms would be arranged accordingly, with the longer spaces between being adjusted to achieve the proper intermittent processing which is called for.

Figure 3:
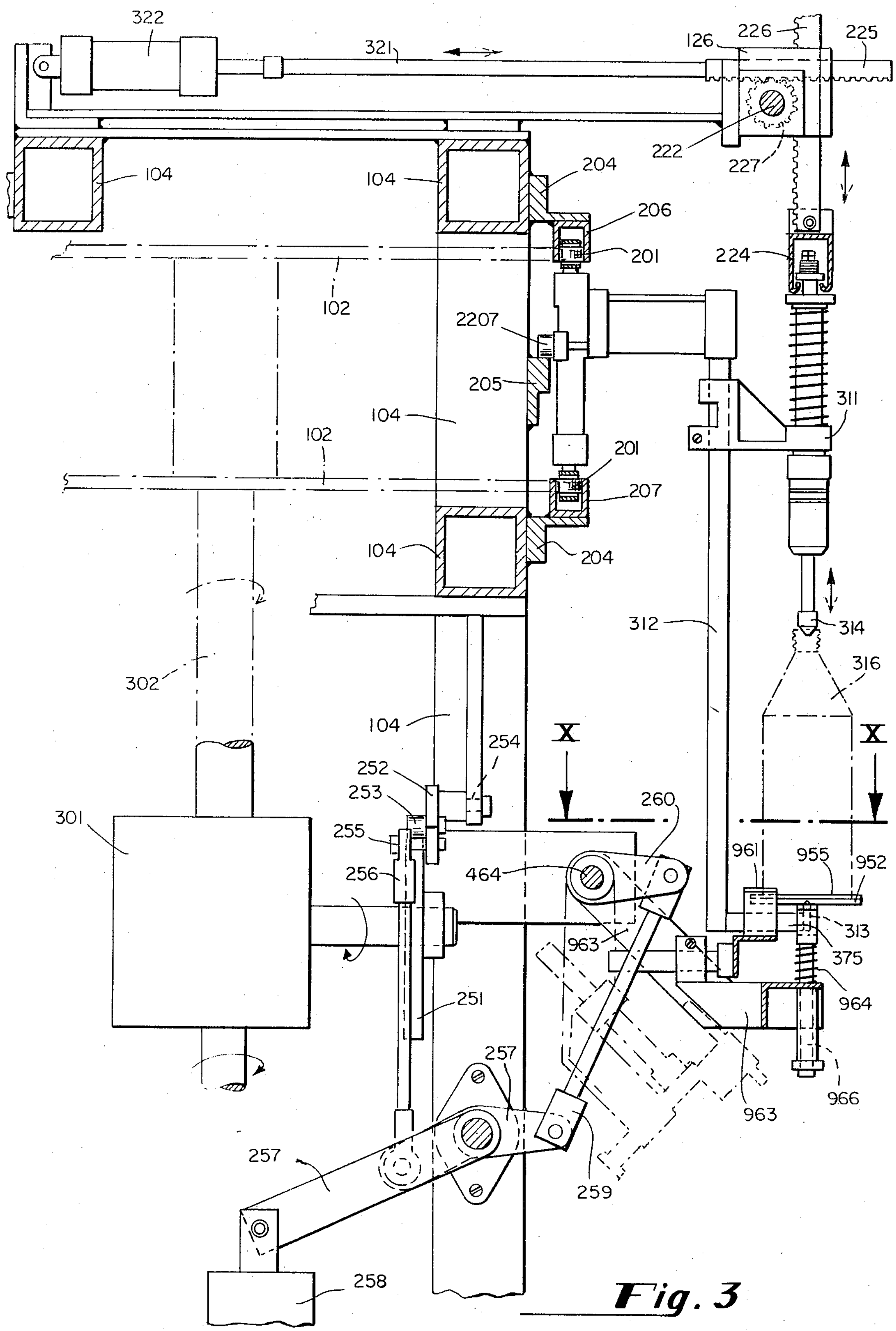
FIG. 3 shows in cross section a container positioning and securement chuck mechanism which embodies the principles of the present invention.

In FIGS. 2 and 3, the main structural frame 104 is provided with cantilevered guides 204 and a structural support ledge 205 to maintain in proper position the overall conveyor mechanism which secures and which mobilizes the chuck mechanisms. More particularly, the cantilevered guide elements 204 include U-shaped channels 206 and 207 whereby a chain drive 201 forms the continuous conveyor loop of FIG. 1 and provides motive force. Hence, as is most clearly shown in FIG. 3, each chuck assembly is supported by a roller 2207 on the ledge 205 and further is guided by the channels 206 and 207. As is shown generally in FIG. 3, a gear assembly 301 provides drive by means of a shaft 302 to the sprocket gears 102 and thence to the chuck assembly by means of the drive chains 201. Many power train assemblies commercially available and well known in the art may be utilized to perform the power function represented schematically by gear box 301 and shaft 302, so no extensive discussion will herein be allocated to that apparatus.

Referring particularly to FIG. 3, each of the chuck assemblies involves a vertical member 312 which is connected to the drive chains 201. Affixed onto the vertical member 312 is an adjustably located structural element 311 which maintains the upper portion of the chuck in position and which serves as a retaining member therefor as shall be described hereinafter. Also, each of the fixed vertical chuck members, such as member 312 of the chuck of FIG. 3, terminates with a horizontal member having an upward point 313. The pointed member 313 serves as a rigid lower supportive aspect of the chuck mechanism. Each chuck mechanism also involves a plunger pin 314 which is spring loaded downwardly, as shall be described hereinafter, and which together with the lower supportive element 313 maintains a bottle such as 316 in position by means of compression, and, therefore in a fixed orientation relative to the basic structural frame 104.

Figure 4:
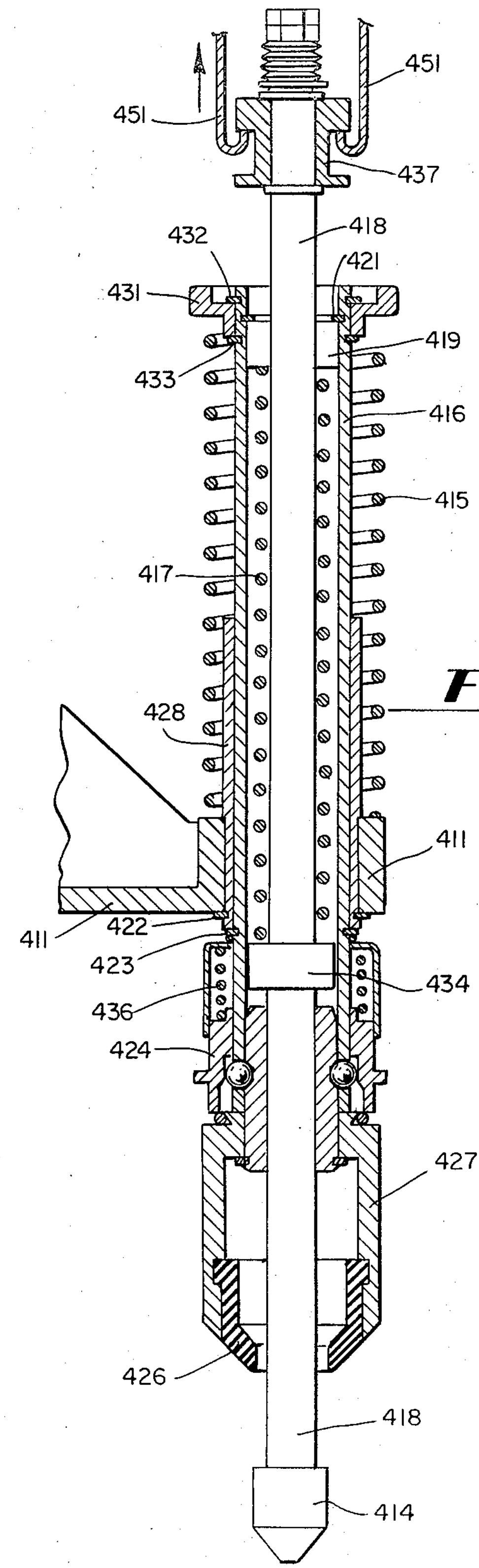

The structure of the upper portion of each of the universal chuck mechanisms which embody the principles of the present invention is shown cross-sectionally in FIG. 4. A retaining member 411 forms a sleeve which corresponds to the similar member 311 of FIG. 3, and which holds the chuck mechanism in position relative to the vertical members such as 312 and 313 of FIG. 3, and to the frame structure 104. Connected within the sleeve formed by the structural member 411 is a cylindrical support 428 which is held in position by means of a fitted connection and by means of a snap ring 422. slidably located within the fixed sleeve 428 is a rigid cylinder 416 which is terminated at its uppermost portion by a hub 431 affixed by means of a pair of snap rings 432 and 433. Concentrically located within the cylinder 416 is a shaft 418 held in position by a pair of spacer cylinders 419 and 434 by means of a spring element 417. Due to the positioning of yet another snap ring 421, the retaining member 419 causes the spring 417 to keep the shaft 418 and the lower cylinder 434 loaded downwardly. The pilot pin 414, which is attached to the lower end of shaft 418, therefore is constantly subjected to a downward force by the spring 417, such that when the pilot pin is registered with the upper extremity of a bottle, a force is exerted pushing the bottle downward. Of course, due to the fixed lower pin member, such as 313 of FIG. 3, the bottle will be held in position due to the opposing forces.

While the functioning of spring 417 between retaining members 419 and 434 loads the shaft 418 downwardly, yet another spring 415, located between the fixed member 411 and the upper shaft hub 431, causes the cylinder 416 to be loaded in an upward direction. That is, the force of spring 415 exerted upwardly against the terminating hub 431 of the cylinder 416 causes that cylinder to be pushed upwardly, the limit of this travel being provided by a snap ring 423 located below the structural member 411. The principal function served by the upwardly loaded cylindrical shaft 416 is to allow for a mask to be slid down over a portion of the bottle being coated in order to prevent plastic from being applied to some particular area thereof, such as the threaded neck area. In a preferred embodiment, a mask including an outer shell 427 and a flexible sleeve 426 is provided by means of an adjustable, fixed attachment to the cylinder 416 by means of assorted apparatus such as a spring 436, a sleeve 424, and assorted other structural elements which simply ensure proper connection and positioning of the mask shell 427. The top of the central shaft 418 is terminated in a hub member 437 which is similar in configuration and function to the hub 431 which terminates the upper portion of the cylindrical sleeve 416.

In the embodiment of FIG. 4, the upper hub 437 of the pilot shaft 418 is resting upon the arms of a clevis 451, thereby preventing the spring 417 from pushing the shaft 418 in its normal downward motion. Channels such as the clevis 451 are provided in accordance with the FIG. 1 apparatus such that when bottle loading or unloading is to be performed, the terminating hub 437 is inserted into the clevis channel 451 and the pilot shaft 418 is raised into position shown in FIG. 4 by raising the channel 451. Thereupon, a bottle may either be removed from its position between the pilot pin 414 and the bottom retaining member such as 313, or alternatively new bottles for coating may be placed into such position. It may be noted at this point that the terminating hub 431 of the cylindrical shaft 416 provides a similar function for the positioning of the masking sleeve 427 relative to the bottles. Thus, an appropriately sized clevis channel may be positioned over hub 431 to position the mask 426 and 427 appropriately relative to the bottles as the clevis is lowered against the force of spring 415.

Figure 5:
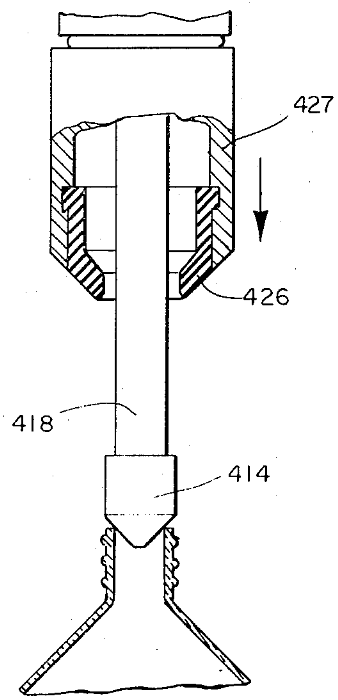
FIGS. 4 through 6 show cross-sectional views of portions of the adjustable chuck mechanism of FIG. 3.
Figure 6:
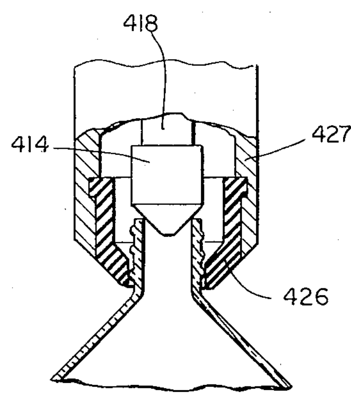

FIGS. 5 and 6 are illustrative of the operation of the chuck mechanism of FIG. 4 relative to a given bottle. The situation illustrated in FIG. 5 represents the case wherein the terminating hub 437 of the pilot shaft 418 is not restrained upwardly by the clevis 451 as shown in FIG. 4. Therefore, the spring 417, during such time, forces the shaft 418 and pilot pin 414 downwardly into registry with a container which has been appropriately positioned. In the normal case, however, the upwardly loaded mask including elements 426 and 427 remains in a position away from the bottle. FIG. 6 illustrates the circumstance in which a clevis over hub 431 forces the mask down over the threaded portion of the bottle. Fitted into the metallic structural shell 427 of the mask is a rubber member 426 which conforms approximately to the size of the bottle being processed and which forms a reasonably tight fit therewith, thereby preventing resin powder of the fluidized bed from penetrating over the portion of the bottle which is not to be covered (e.g., the threaded portion thereof).

In summary, FIGS. 4, 5, and 6 illustrate the operation of a universal chuck mechanism which embodies the principles of the present invention and which is designed to operate in conjunction with the conveyor system shown in FIG. 1. Centrally mounted within a cylindrical member 416 is a pilot shaft 418. A first spring 415 causes the cylindrical element to be loaded in an upward direction, whereas a second spring 417 causes the pilot shaft to be loaded downwardly. Both the cylindrical member 416 and the central shaft 418 are terminated at their upper portions by hubs 431 and 437 which define ledges for the application of pulling or pushing force by means of a clevis or the like. Under appropriate mechanical control, the pilot pin 414 which terminates the shaft 418, and the mask members 426 and 427 which terminate the cylinder 416 are positioned over a bottle such as shown in FIGS. 5 and 6.

The functioning of these two aspects of the universal chuck mechanism of FIG. 4 may be illustrated by reference back to FIG. 1. During the predominant portion of a cycle of a given chuck around the entire conveyor system of FIG. 1, it is desired that the bottle being processed by held in position. At the loading and unloading stages, however, it is necessary that a pilot pin such as 414 of FIG. 4 on its pilot shaft be lifted upwardly in order to either remove or insert a bottle from the conveyor. Accordingly, at the loading and unloading aspects of the conveyor, a clevis such as 451 in FIG. 4 is provided to fit onto the hub 437 which terminates the shaft 418. Thereupon, control circuitry is actuated and the clevis 451 is lifted upwardly, thereby pulling the pilot shaft 418 against the force of the inner spring 417 above the top of a bottle. Whenever the loading or unloading operation has been accomplished, the clevis may be lowered once more, and the loading force of the spring 417 once more forces the pilot shaft downward into a position in registry with a bottle for processing. Shown in FIG. 1 are control actuation circuits 119 and 126 are situated near clevises such as 451, and which actuate them to lift the downwardly loaded pilot shaft 418 away from the bottle.

In summary, therefore, the embodiment of FIG. 1 involves control circuitry at unloading station 119 and at loading station 126 whereby a clevis (not shown) such as 451 is provided and is further actuated to lift the pilot shaft 418 and pilot pin 414 away from the bottle. At all other times, the downward loading of the inner spring 417 forces the shaft downward onto the bottle being maintained in position.

In contrast to the pilot shaft 418, which is normally loaded into position over a bottle, the masking function only needs to be provided while the bottle is being subjected to immersion in the fluidized bed. Consequently, it is loaded upwardly by an outer spring such as 415 of FIG. 4, and remains out of position for the large majority of the cycle. At the immersion station 113, control is therefore provided for lowering the mask down over the desired portion of the bottle being coated. As will be particularly illustrated in conjunction with FIG. 14, a clevis and appropriate control circuitry is provided at that point to force the mask down over the bottle while the immersion in the fluidized bed takes place. Thereafter, as the coated bottle is passed into the post-heating oven 116 for plasticizing the resins, the mask is no longer needed so the force of the clevis is reversed and along with the upward loading provided by spring 415 forces the mask away from the bottle. During the balance of the cycle of the FIG. 1 apparatus, the mask remains up and out of position such as shown in FIGS. 4 and 5.

FIGS. 2 and 3 illustrate how this sort of control is achieved. In FIG. 2, the control provided at the unloading station is embodied at gearing mechanism 119 which in turn is connected to a clevis channel 223. Likewise, the control at the loading station occurs by means of an elongated clevis channel 224 which may be lifted by gearing mechanisms 126 and 221. All three of the loading mechanisms are connected by means of a drive shaft 222. In FIG. 2, as the chuck mechanisms are moved around the conveyor system with the position shafts (such as 418 in FIG. 4, 314 in FIG. 3, etc.) in the downwardly loaded state, the upper terminating hubs such as 437 of FIG. 4 slide into a clevis channel 223 or 224. Since the drive of the endless conveyor is intermittent, time is provided for the gearing mechanisms 119, 126, and 221 to be energized to lift the clevis channel upward and, similarly, to lift the positioning shafts and pins of the corresponding chuck mechanisms.

As shown in cross section in FIG. 3, the clevis channel position control mechanism particularly includes an air cylinder 322 which drives a shaft 321, which in turn terminates in a rack 225. Intermeshed with teeth of the rack 225 is a gear 227 which is fitted over the shaft 222. Similarly intermeshed with the gear 227 is a vertical rack 226 which terminates at the clevis channel 224. Clevis channel 223 is similarly operated by shaft 222 at gear control station 119. Normally, the cylinder 322 is in a state with the shaft 321 being at its maximum outward travel, and correspondingly with the clevises 223 and 224 at their lowest points. Whenever the air cylinder 322 is periodically actuated, the main shaft 321 is drawn inwardly, and the gear 227 is turned in a counterclockwise direction. Consequently, the clevis 224 is drawn upwardly by rack 226. As disclosed hereinbefore, the raising of the clevis 224 occurs on the endless conveyor of the FIG. 1 embodiment both at the loading and at the unloading stations. At the unloading station, opportunity is given for the now coated bottle to be removed from the chuck mechanism, and at the loading station, the upward clearance of the positioning shaft allows for the bottles to be placed there between after which the clevis 224 is lowered once more and the bottle is held in place by compression between the positioning pin such as 314 and the fixed bottom member such as 313. Once the air cylinder 322 is reversed and the clevis 224 is correspondingly lowered, the conveyor once again is actuated to continue its intermittent motion, and the chucks are moved along the conveyor path.

Figure 7:
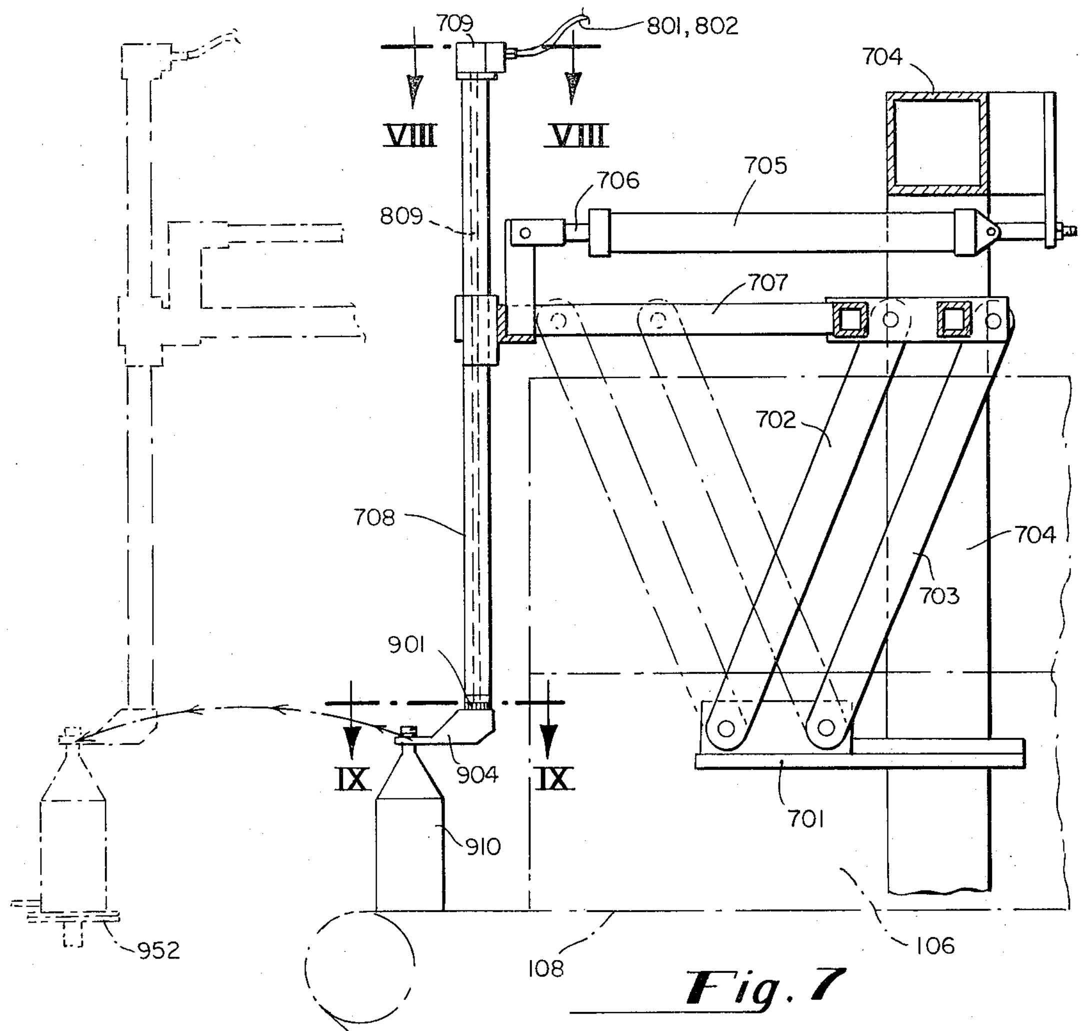
FIGS. 7 through 9 illustrate a loading mechanism which may be utilized in conjunction with the FIG. 1 apparatus.
Figure 9:
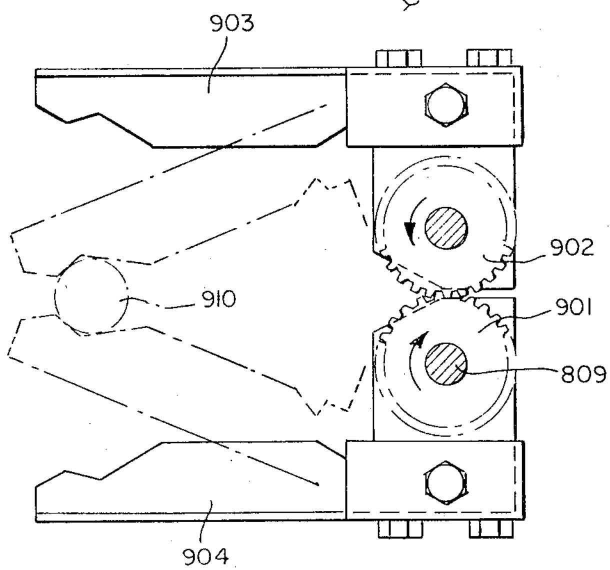
Figure 8:
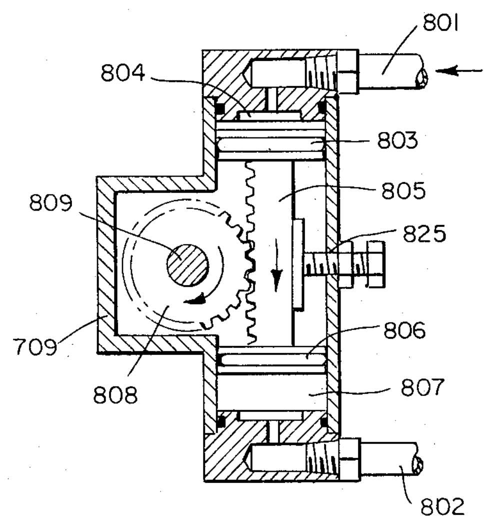

A loading arrangement which may be utilized in conjunction with apparatus embodying the principles of the present invention is illustrated in FIGS. 7, 8, and 9, as well as in general form in FIGS. 1 and 2. The heated bottles are passed from the lehr 106 by means of a conveyor belt 108, at the end of which they may be apprehended by apparatus such as shown in FIG. 9. In particular, the apparatus which embodies the functions of grasping the bottles and conveying them over to the continuous conveyor mechanism is as follows. The basic support structure 704 for the lehr includes a fixed platform 701, to which are attached left and right pairs of lever arms 702 and 703. The arms 702 and 703 are in turn pivotably mounted to a lateral bracket 707, which in turn is coupled to a grasping mechanism generally designated 708. Also affixed to the frame 704 is a hydraulic cylinder 705, the piston 706 of which is also coupled to the grasping mechanism 708. Each time bottles are apprehended by the grasping mechanism 708, the cylinder 705 is energized and forces its piston 706 outwardly, thereby pivoting the arms 702 and 703 to the position shown in dotted line format. A corresponding translation of motion occurs for the grasping mechanism 708, and, with one or more bottles such as 910, is moved outwardly to the position shown in dotted lines at the left of FIG. 7.

The grasping mechanism 708 operates under the control of the topmost portion generally designated 709 in FIG. 7, which is shown in detailed cross section in FIG. 8. Alternate air inputs 801 and 802 compress air into cavities 804 and 807. Slidably located within the cavities are pistons 803 and 806 which are connected by a rack member 805. Thus, feeding of compressed air by means of inlet 801 into chamber 804 forces the piston 803 in a downward direction as shown in FIG. 8, and consequently turns the gear 808 meshed with the rack in a clockwise direction. Likewise, feeding of compressed air through the alternate inlet 802 into chamber 807 forces the piston and rack arrangement upwardly, and turns gear 808 in a counterclockwise direction. A threaded screw control 825 regulates the pressure between the rack element 805 and the gear 808, thereby ensuring precise operation.

The gear 808 is connected by means of a shaft 809 downwardly into a gear 901 which is located in the bottom portion of the grasping mechanism 708. Gear 901 meshes with gear 902 such that they turn in opposite directions to one another. Connected to the gears 901 and 902, respectively, are a pair of grasping fingers 903 and 904. As air is inserted through inlet 801, gear 808 is turned in a clockwise direction, and, by means of shaft 809, gear 901 at the bottom of the grasping mechanism 708 is similarly turned. Juxtaposed with gear 901 is gear 902, which in turn is rotated in a counterclockwise manner. This operation of gears 901 and 902 causes the fingers 903 and 904 to close upon themselves, and to grasp a bottle such as 910 in the fashion shown in dotted line form in FIG. 9. Thereupon, the cylinder 705 is energized and the entire grasping mechanism 708 is moved upwardly to the dotted portion shown in FIG. 7. Next, air is forced into chamber 807 by means of inlet 802 of the grasping mechanism 708, gear 808 is turned counterclockwise, and the fingers 903 and 904 are opened, thereby permitting the bottle such as 910 to remain in that position relative to the conveyor system.

When the grasping mechanism 708 of FIG. 7 is pushed outwardly by the cylinder 705 to the dotted line position of FIG. 7, the bottles are placed onto receiving apparatus such as shown in FIGS. 10, 11 and 12. More particularly, that apparatus includes a pair of tables 951 and 952 which are pivotably mounted by means of a lever arm 963. Each of the tables 951 and 952 includes elevated tread portions 953, 954, 955, etc. In addition, slots 956 and 957 are cut into the tables 952 and 951 in order to permit the pivoting of the table upwardly around the lower portions such as 375 and 313 of the chuck mechanisms. Each of the tables includes slanted guide portions such as 958, 959, and 961 such that the grasping mechanism 708 will insert the bottles into proper registry with the chuck mechanisms. Thus, in FIG. 10, the circular dotted lines represent bottles once they are placed in position on the tables 951 and 952 by the grasping mechanism 708.

From the lateral view shown in FIG. 11, the tables such as 952 are spring mounted by means of a shaft 966 and a compressed spring 964 onto a platform 962 which is mounted on the lever arm 963. When the bottles are placed onto the tables 951 and 952 by grasping mechanism 708, the upper portion of the chuck mechanism (i.e., the part shown in FIG. 4) has its positioning pin held in its upward position, by upward extension of the clevis 224. Therefore, the bottle merely rests on the tread such as 955 in FIG. 11. When, however, the clevis 224 is lowered by the action of the air cylinder 322, the positioning pin, such as 314 in FIGS. 2 and 3 and 414 in FIG. 4, is allowed to be forced downwardly onto the bottle by means of its normal spring loading. This downward force onto the bottle causes the spring such as 964 onto which the table such as 952 is mounted to compress somewhat, until the vertical pin portion such as 313 of the chuck mechanism makes contact with the bottom of the container. This situation is shown in FIG. 12. Once the FIG. 12 situation arises, the bottle is firmly held in position by the chuck mechanism, and the tables 951 and 952 may be lowered out of position. Therefore, antecedent to energizing of the conveyor to move the now apprehended bottles on for processing, the tables 951 and 952 are pivoted downwardly by means of the lever arm 963.

The pivoting motion of the table 951 and 952 may be appreciated by consideration of FIGS. 2 and 3. A shaft from the main drive mechanism 301 is connected to a cam 251, which is circular but for an indentation over a portion of its periphery. Riding on the cam 251 is a wheel 253 which is fixed to a lever bar 252. The lever 252 is fixed at one end to the frame by means of a pivot connection 254, and to its other end by means of a connection 255 to a drive rod 256. As the cam 251 turns, the wheel 253 either rises or lowers, depending on the portion of the periphery of the cam to which it makes contact. Correspondingly, the lever arm 252 rises or lowers by a predetermined amount. As the arm 252 is raised, corresponding to location of the wheel 253 on the long radius portion of the cam 251, the bar 256 is also raised accordingly. Connected to the lower end of the bar 256 is another lever arm 257, and a counterweight 258. The counterweight 258 is optional, but it helps obtain efficient operation. As the bar 256 is moved upwardly by lever arm 252, element 257 rotates in a clockwise direction, and a rod 259 connected thereto is moved downwardly. In turn, by means of a connection 260, the tables 951 and 952 are swung downward in the position shown by dotted lines in FIG. 3. Whenever the cam 251 is turned such that wheel 253 rides on the shorter radius portion thereof, the lever arm 252 moves downwardly, and, by means of rods 256 and 259, the connecting element 260 moves upwardly, and the table is pivoted into place such as shown in solid lines in FIGS. 2, 3, and 10. In summary, therefore, the position of the tables 951 and 952 is either in the solid line or dotted line positions of FIG. 3, depending upon whether the wheel 253 is riding on the shorter or the longer radius portions of the cam 251. In the preferred embodiment, the tables are pivoted upwardly for receipt of bottles from the grasping mechanism 708, and as soon as the upper positioning shaft is released to force the bottle into securement on the chuck, the table is swung away so that the bottles may be moved onward for processing. Thereupon, as the cam 251 is further rotated and the wheel 253 rides up to the other radius portion, the tables once more are swung into horizontal position for receipt of subsequent bottles for processing.

Figure 14:
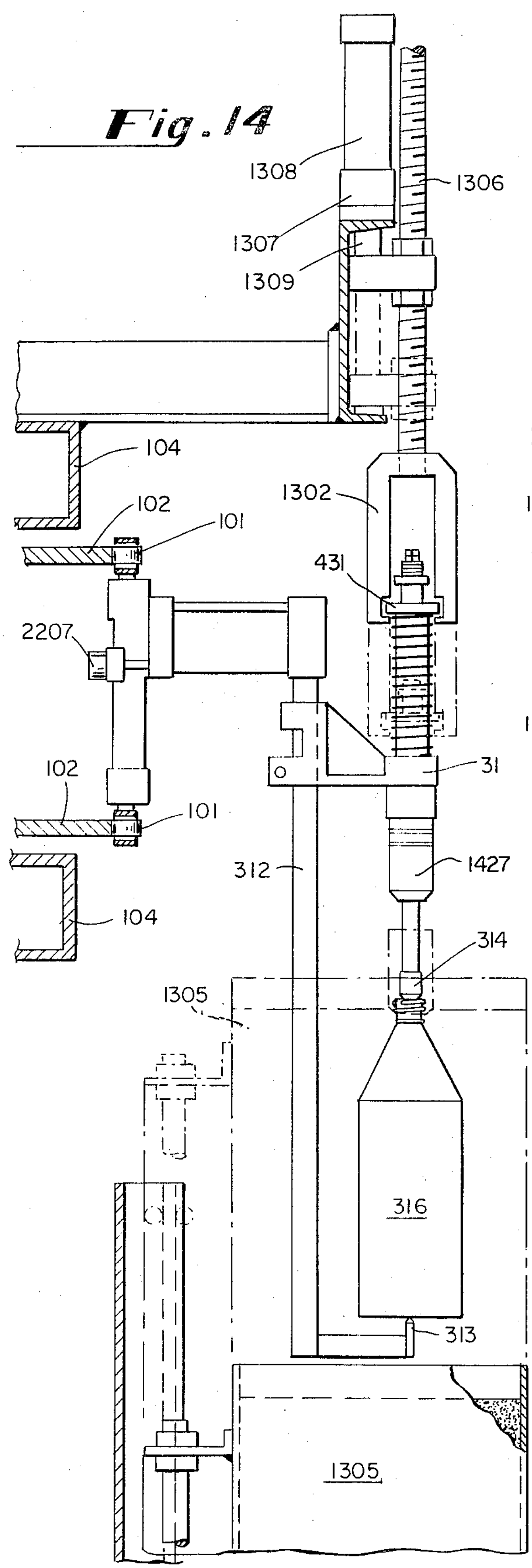
FIGS. 13 and 14 illustrate the masking operation afforded in conjunction with the principles of the present invention, for the immersion of containers in a tank containing a fluidized bed.
Figure 13:
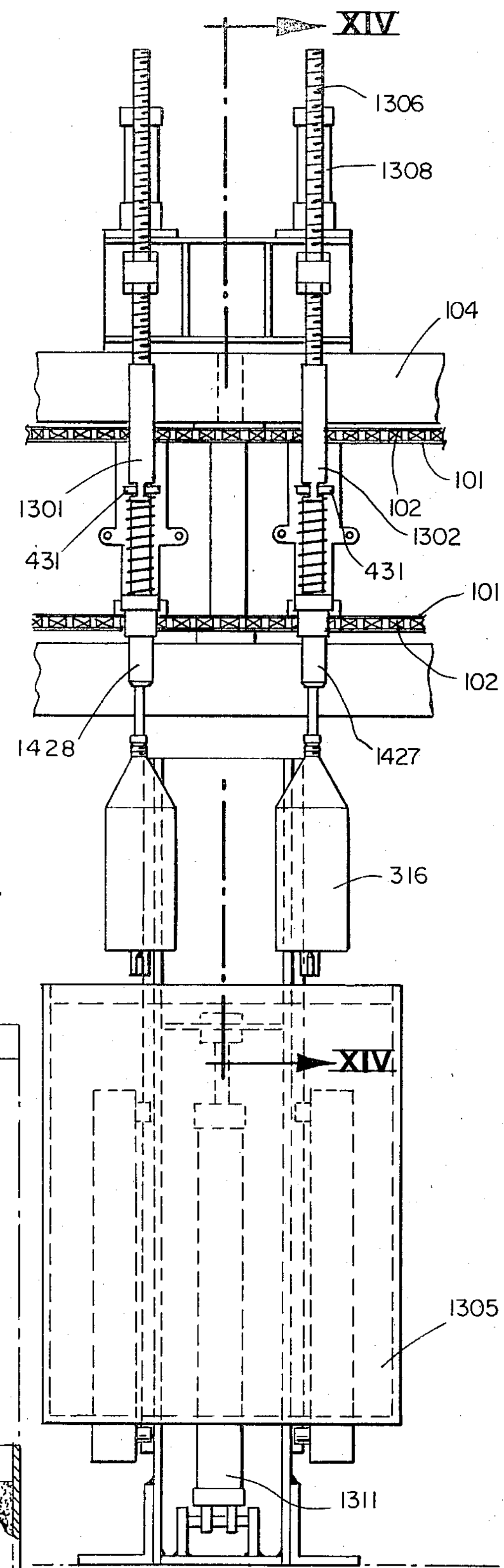

After the bottles are indexed on respective chuck mechanisms and the support tables 951 and 952 are pulled away, the conveyor moves onward and next positions the bottle at position 113 of FIG. 1. It is at this point that they are immersed in the fluidizing bed. This operation may be seen more clearly from consideration of FIGS. 13 and 14. In FIG. 13, two chucks with bottles indexed thereon are positioned over a tank 1305 which contains the fluidized bed. As the chucks bearing the bottles are indexed above the tank 1305, a pair of clevises 1301 and 1302 are located over the chucks. In particular, it is the function of clevises 1301 and 1302 to force the outer cylindrical sleeve (e.g., such as element 416 of FIG. 4) downwardly against the force of its spring 415, thereby fit the mask over the threaded portion of the bottles. As is shown in FIG. 14, the clevis 1302 is adjustable in position, being connected by means of a threaded shaft 1306 to ride in a channel on an extension 1307 of the main frame 104. In particular, the extension 1307 includes an air cylinder 1308 which by means of a shaft 1309 forces the threaded shaft 1306 along with the clevis 1302 in a downward motion. As described in conjunction with FIG. 4, this causes the corresponding protected sleeve such as 1427 to be forced downwardly over the threaded portion of the bottle.

Simultaneously with the downward forcing of the sleeve 1427 and 1428 over the threaded portion of the bottles, the fluidized bed in tank 1305 is raised upwardly by means of yet another compressed air cylinder 1311. In fact, it is preferred that the fluidized bed be raised up over the bottles just after the protective shields are brought downwardly over the threaded portion thereof. Since the bottles retain heat from the lehr 106, the powdered thermoplastic resins from the fluidized bed adhere thereto and begin to plasticize somewhat. After a desired period of immersion, the air cylinder 1311 allows the tank 1305 to be moved downwardly once more, and the sleeves 1427 and 1428 are lifted upwardly from the protected portion of the bottles. Thereupon, the conveyor once more moves the chuck mechanisms on, in this case into the post-heating oven 116. Thereupon, as described hereinbefore, the bottles are subjected to a heating whereby the resin powders become thoroughly plastic, are given a cooling first in the air at ambient temperature and then in cooled air, and are finally removed from the chucks at station 119. Thereupon, after air cleaning of the chucks, the loading operation is conducted once more.

The foregoing description has dwelled only intermitantly upon the relative timing between the load, unload, fluidized bed coating, and the like stages of operation. In practice, the temporal alteration of these processes such that they effectively interact with one another as desired is believed to be merely a design option, which would be freely variable at the behest of designers skilled in the art. However, for purposes of completeness, FIG. 15 shows a table in which all portions of the embodiment of FIG. 1 are designed to operate in synchronous harmony with one another on the basis of 12 second cycles. In other words, every 12 seconds, the cycle is repeated with bottles or other such containers being moved to different stages on similar intervals. Again, alteration of the timing chart of FIG. 15 is believed to be merely a design option.

The foregoing disclosure has been cast principally in terms of the coating of glass bottles. It has been asserted at several times that the chuck mechanisms which embody the principles of the present invention may readily be adapted to process containers of other forms. As an example, FIG. 16 shows how the chuck mechanism might be conditioned to operate for the coating of glasses in a fluidized bed. In such a situation, the masking operation would be provided to prevent coating of the interior of the glass.

In FIG. 16, the glass 1601 is shown positioned on the chuck with the mask in its operative position. The central shaft 1604 of the upper portion of the chuck, which is loaded downwardly, has a positioning pin member 1603 attached by means of a sleeve 1608. The glass is secured between the lower member 1602 and a teflon pad 1610 which terminates the pin 1603. Affixed to the sleeve 1608 by a snap ring 1609 is a teflon positioning collar 1607. As the pin 1603 is moved downward, the relatively friction free collar 1607 moves the glass 1601, as necessary, to position the pin 1603 substantially in the center thereof. The mask, which includes a rigid housing 1605 and a flexible facing member (such as rubber) 1606, then is assured of proper registry with the rim of the glass 1606.

Likewise, many other embodiments for the mask and for the other apparatus disclosed hereinbefore, such as the upper positioning pins and the lower securement members, may occur to those skilled in the art without departing either from the spirit or the scope of the principles of the present invention.

I claim:

1. A chucking mechanism for securing containers for processing comprising:

a. supportive frame means for said containers including first securement means;

b. second securement means attached to said supportive frame means and positioned opposite said first securement means, said second securement means including 1. plunger means slidably mobile toward said first securement means, containers being secured in position between said first and second securement means by compression from said plunger means; and 2. masking means independently slidably mobile to cover a specified portion of said container;

c. first means for controlling the position of said plunger means; and d. second means for controlling the position of said masking means.

2. A chucking mechanism as described in claim 1 and further including support means for positioning containers between said first and second securement means while said plunger means is in a relaxed position from said first securement means.

3. A chucking mechanism as described in claim 1 wherein said plunger means includes:

a. a shaft terminating at one end with a first hub and at the other end with a positioning pin formed to mate with said containers; and b. spring means exerting force on said shaft in a direction toward said first securement means.

4. A chucking mechanism as described in claim 3 wherein said shaft further includes a retaining ledge thereon and wherein said masking means terminates at its upper end in a second hub, said spring means being compressively located between said retaining ledge and said second hub.

5. A chucking mechanism as described in claim 3 wherein said first means for controlling includes:

a. a clevis formed to mate over said first hub; and b. motive means attached to said clevis for forcing said shaft in a direction opposite said first securement means.

6. A chucking mechanism as described in claim 1 wherein said masking means includes:

a. a cylindrical structure concentric about said plunger means and terminating in a first hub; and b. spring means compressively located between said first hub and said supportive frame means for exerting force on said cylindrical structure in a direction opposite said first supportive means.

7. A chucking mechanism as described in claim 6 wherein said cylindrical structure terminates at its other end with a mask formed to fit over a specified portion of said containers.

8. A chucking mechanism as described in claim 6 wherein said second means fof controlling includes:

a. a clevis formed to mate over said first hub; and b. motive means attached to said clevis for forcing said cylindrical structure in the direction of said first securement means.

9. A chucking mechanism as described in claim 1 wherein said first securement means is located directly below containers to be processed and said second securement means is located opposite said first securement means and above containers to be processed, said chucking mechanism further including pivotable support tables for positioning containers between said first and second securement means.

10. A system for coating arbitrarily shaped containers over a predetermined portion of their surface comprising:

a. a continuous horizontal conveyor;

b. a plurality of chucking mechanisms located periodically along said conveyor, each of said chucking mechanisms including 1. supportive frame means attached to said conveyor and including lower securement means,
2. upper securement means attached to said supportive frame means and positioned opposite to and above said lower securement means, said upper securement means including A. plunger means slidably mobile toward said lower securement means, containers being secured in position between said lower and upper securement means by said plunger means, and B. masking means concentric with said plunger means and independently slidably mobile to cover a specified portion of said containers;

c. first means located at at least one point on said conveyor for controlling the position of said plunger means, and d. second means locsted at at least one point of said conveyor for controlling the position of said masking means.

11. A system as described in claim 10 and further including a loading station for feeding containers to said system, said loading station comprising:

a. one of said first means for controlling the position of said plunger means;

b. a pivotable support table for positioning containers above lower securement means of chucking mechanisms at said loading station as associated plunger means are forced away from said containers by said one of said first means;

c. a heating lehr for producing heated containers for coating; and d. transfer means for periodically moving containers from said lehr to said table, said plunger means being released by said one of said first control means to secure said containers so transferred.

12. A system as described in claim 11 wherein said one of said first means includes:

a. a clevis which fits over a portion of said plunger means; and b. motive means attached to said clevis for forcing said plunger in a direction away from said lower securement means.

13. A system as described in claim 10 and further including a coating station for applying coating materials to containers secured on said chucking mechanisms, said coating station comprising:

a. a fluidized bed tank having suspended therein powered coating materials;

b. means for raising said tank upwardly to immerse containers secured on said chucking mechanisms in said coating materials;

c. one of said second means for controlling the position of said masking means, masking means being lowered to protect a specified portion of said containers from said coating materials prior to immersion of that specified portion into said fluidized bed tank.

14. A system as described in claim 13 wherein said one of said second means for controlling includes:

a. clevis means which fit over a portion of masking means of chucking mechanisms positioned over said fluidized bed tank; and b. motive means attached to said clevis means for forcing said masking means in the direction of said containers.

15. A system as described in claim 10 and further including a post-heating oven through which containers on said chucking mechanisms are conveyed after being coated.

16. A system as described in claim 10 and further including a cooling stage for lowering the temperature of coated containers secured on said chucking mechanisms.

17. A system as described in claim 10 and further including an unloading station for removal of coated containers from said conveyor, said unloading station including one of said first means for controlling to force plunger means away from containers to be unloaded, thereby releasing the containers for securement between said upper and lower securement means.

18. A system as described in claim 17 wherein said one of said first means for controlling includes:

a. clevis means which fit over a portion of masking means of chucking mechanisms positioned over said fluidized bed tank; and b. motive means attached to said clevis means for forcing said masking means in the direction of said containers.

* * * * *